United States Patent Office 3,503,879
Patented Mar. 31, 1970

3,503,879
METHODS AND COMPOSITIONS FOR REMOVING ALLUVIUM AND OTHER DEPOSITS IN WATER SYSTEMS
Theodore W. Zierden, Oakdale, Pa., assignor to Calgon Corporation, a corporation of Pennsylvania
No Drawing. Filed Mar. 16, 1964, Ser. No. 352,337
Int. Cl. C02b 1/20
U.S. Cl. 210—57
8 Claims This invention relates to methods and compositions for removing alluvium and other deposits in water systems and particularly to methods and compositions for the removal of mud, silt, and other accumulations and deposits in water systems by the addition of insoluble potassium metaphosphate together with a solubilizing agent therefor. In particular, it relates to the addition to water of insoluble potassium metaphosphate together with a solubilizing agent for the metaphosphate either alone or together with certain antialluvium aids such as bentonite, starch, carboxy methyl cellulose, polyethylene oxide, polyacrylamide, and/or certain cationic materials, such as the polyamines, to remove and wash away deposits of alluvium and other undesirable deposits such as iron oxides and products of corrosion from industrial cooling apparatus.

Much of the water which is used in industrial cooling systems, such as for example, the cooling systems in blast furnaces, open hearth furnaces and the like in the steel industry, and cooling towers in the oil industry, is derived from rivers, ponds, lakes or other sources of impure natural waters. These natural waters carry various amounts of silt, mud, and/or organic wastes and other accumulations which deposit on heat exchange surfaces and create problems of corrosion, loss of heat transfer efficiency, and the like, as well as reducing the area of the passageways and thus the amount of cooling water which can be circulated. In installations, such as in the surface condensers associated with turbine generators, alluvium very seriously affects the rate of energy conversion. In other areas, such as in pipes, sewers, heated water lines, etc., the alluvium tends to block the passage of water, creating serious problems in water flow.

In many industrial heat exchange installations and in many pipe line systems carrying natural waters, operations must be halted periodically so that the system can be cleaned out mechanically or with acid or some other means. This is obviously an expensive and highly undesirable situation.

I have discovered a method of removing and preventing such deposits of alluvium which is very effective and which markedly improves the efficiency and economics of heat exchangers and other systems carrying natural waters where alluvium is likely to be deposited. The method of my invention comprises periodically adding to the water in the system a small amount of insoluble potassium metaphosphate together with a solubilizing agent therefor. In addition to the insoluble potassium metaphosphate and the solubilizing agent for such phosphate, I may add other agents which in some circumstances act to improve the effectiveness of the method, for example, the addition of small amounts of bentonite, starch, carboxy methyl cellulose, polyethylene oxide, polyacrylamide, urea, as well as the polyamines, and certain cationic materials may be added to improve the effectiveness of the treatment in certain conditions.

Preferably I add between about 0.8 part per million to about 20 parts per million of insoluble potassium metaphosphate to a water system to be treated at periodical intervals, such as for example, at a period of from 20 to 30 minutes every 12 hours. I have found that once a system has been cleaned, very small amounts of insoluble potassium metaphosphate are needed to maintain the system free from deposits of alluvium; for example, in a new system in which no alluvium is present as a deposit, I have found that 0.8 to about 8 parts per million, depending upon the concentration of alluvium in the water being fed, will maintain the system clean if added to the system for intervals of 20 to 30 minutes every 12 hours. I have found that where substantial deposits of alluvium have already occurred, it is necessary to begin the treatment with larger amounts of insoluble potassium metaphosphate and to reduce the amount when the system becomes cleaned.

It is essential that a solubilizing agent be added along with the insoluble potassium metaphosphate in order that it becomes promptly effective. As the solubilizing agent, I prefer to add salts of lithium, sodium and ammonium. I have found that the presence of large concentrations of hydroxide ions and ions of aluminum, silicon and peroxide retards, if not prevents, the solubilizing of the metaphosphate. Therefor, these ions must preferably be avoided. I have also found that ammonium molybdate is not effective for the solubilization of the metaphosphate, although all other salts of ammonium appear to be effective except as previously noted. I have found that sodium molybdate is quite effective.

As a preferred composition, I provide about 40% insoluble potassium metaphosphate and 60% sodium chloride as the solubilizing agent, however, the proportions of insoluble potassium metaphosphate and solubilizing agent may be varied. It is essential that there be sufficient solubilizing agent present to cause the dissolution of an amount of potassium metaphosphate into the water to prevent the deposition of alluvium from the water. As indicated above, this is about 0.8 part per million to about 20 parts per million. Larger amounts of potassium metaphosphate do not appear to be harmful but, on the other hand, are generally uneconomical and are simply wasted.

I have found that a composition containing 50 to about 90 parts by weight of a bentonite clay and the balance insoluble potassium metaphophate together with an appropriate amount of solubilizing agent to make 100 parts is a very effective material for removing and preventing alluvium deposits. I have also found that the addition of certain dispersing agents, such as the polyamines, sodium carboxy methyl cellulose, polyethylene oxide, urea and the polyamines and certain cationic materials enhances the effectiveness of my material. However, certain common dispersants, such as tannin, sodium-lignin sulphates and other lignin derivatives appear to degrade the use of the insoluble potassium metaphosphate and should be avoided. The dispersing agents which I have mentioned above are not essential but may be optionally used. I prefer to use as a dispersant the sodium salts of carboxy methyl cellulose and its derivatives such as carboxy methyl hydroxy ethyl cellulose and the like.

The operation and effectiveness of my invention can perhaps be best illustrated by referring to the following examples.

Example I

A larger heat exchanger in a foundry was treated by the addition of a composition made up of 40% insoluble potassium metaphosphate and 60% sodium chloride. The treatment was based upon a half hour addition of this composition to the water at a rate sufficient to provide 8 parts per million in the water during the treating period. The treatments were provided twice daily or every 12 hours. Prior to treatment the heat exchanger had been required to be cleaned every 4 to 5 weeks. During the period of treatment no deposit of alluvium was observed and the exchange efficiency continued at the same high level and the period of the test which was approximately 12 weeks.

Example II

A large condenser of a power generator turbine was treated as in the case of Example I. Again the condenser prior to treatment was shut down monthly for cleaning. During the treatment period no accumulation of alluvium of any significance was observed.

Example III

A cooling tower on a gas compressing station was treated as in Example I. The results were the same as in Example I.

Example IV

A heat exchanger in a petroleum refinery was treated as in Example I with like results.

Example V

The heat exchanger in the same foundry as Example I was treated with a mixture of 55% sodium chloride, 35% insoluble potassium metaphosphate and 10% starch at the rate of 8 parts per million for ½ hour every 12 hours. The material effectively prevented the deposition of alluvium and appeared to keep the exchanger slightly cleaner than in the case of Example I, although in neither case was there any substantial loss of efficiency.

Example VI

The same condenser as in the case of Example II was treated with the composition of Example V. Again the composition with starch appeared to be slightly superior in maintaining cleanliness.

Example VII

The same cooling tower as in the case of Example III was treated with the composition of Example V. The results were identical with those of Example III. There did not appear to be any noticeable difference in the effectiveness of the two materials.

Example VIII

A condenser on a blast furnace steam turbine was treated with both the materials of Example I and Example V at separate times. In both cases, 6 parts per million of the respective compositions was added for ½ hour every 12 hours. In both cases the materials prevented the deposition of alluvium and maintained the condenser surface clean and free of corrosion. No noticeable difference was apparent in the two treatments.

Example IX

A cooling tower on a gas compressor station was treated with an addition of a composition made up of 55% sodium chloride, 35% insoluble potassium and 10% starch at a rate of 8 parts per million every 12 hours for 30 minutes. The addition fluidized the existing deposits and maintained the tower clean thereafter.

Example X

The same treatment outlined in Example IX was used on the condenser of a power generator turbine using river water with identical results.

Example XI

A heat exchanger in a large foundry was treated with a composition made up of 57% sodium chloride, 37% insoluble potassium metaphosphate and 6% starch at a rate sufficient to provide 8 parts per million in the cooling water every 12 hours for 30 minutes. The addition fluidized the mud deposits and maintained the tower clean.

Compositions in which Carbowax 6000, poly vinyl alcohol, carboxy methyl cellulose, urea, bentonite, polyethers (e.g., Union Carbide "Polyox"), polyacrylamide, pentachloro phenate were substituted for the starch of Examples IX and XI produced effective removal of alluvium in both hot and cold water systems.

Example XII

A paper plant using well water for a cooling tower system was subjected to fouling of the surface condenser every three to four weeks with precipitated iron oxide. The treatment of the system by the practice outlined in Example IX reduced the fouling to every four to five months.

Example XIII

A metal refining plant using well water on a once through cooling water system was subject to fouling by precipitated iron oxide on the heat exchangers and valves every two weeks. Treatment with the composition and practice of Example IX removed the existing fouling and maintained the equipment clean for the six months period of the test.

EXAMPLE XIV

The test of Example I was repeated using a formulation of 20% insoluble potassium metaphosphate and 80% sodium chloride and at a rate sufficient to provide 12 parts per million in the water during the treating period. The results were equivalent to those of Example I.

I have found that the pH of the system has little effect on the results. Tests at pH 3, pH 7 and pH 9 showed no change in the effectiveness of the treatment.

The composition of my invention may be used with success to remove deposits of silt from tanks such as ship ballast tanks and other containers by mixing the composition into the tank with silt and flushing the silt thereby treated from the tanks. Alternatively, the composition of my invention may be fed with water entering the tank and the treated silt allowed to accumulate and be removed when the tank is later drained. The silt treated by the composition of my invention is light and fluid and readily drains out along with the water being removed rather than precipitating and adhering to the container.

While I have illustrated the addition of my invention at 12 hour intervals on half-hour treatment cycles, this may vary depending upon the particular situation. It may be desirable to provide shorter treating cycles at more frequent intervals or it may be desirable to continuously treat the water depending upon the particular situation. For example, in the case of circulating systems in which the same water is recirculated. I have found that it is desirable to add a small amount of insoluble potassium metaphosphate based upon the entire content of the circulating system and to maintain that level in the system. For example, I have found that the addition of 0.8 part per million of insoluble potassium metaphosphate together with a sufficient amount of sodium chloride, solubilized potassium metaphosphate based upon the entire content of the circulating system will remove and maintain the system free from undesirable deposits of alluvium. It is thus clear that different systems may require specifically different amounts and doses of treatment. This will be obvious to men skilled in the art recognizing that insoluble potassium metaphosphate will create an anti-alluvium content within a water system.

While I have illustrated and described certain preferred practices of my invention, it will be understood that this invention may be otherwise practiced within the scope of the following claims.

1. The method of removing and preventing alluvium deposits in water systems which comprises adding to such systems insoluble potassium metaphosphate and a solubilizing agent therefor.

2. The method of removing and preventing alluvium deposits in water systems which comprises adding to such systems insoluble potassium metaphosphate, a solubilizing agent therefor and a compatible dispersing agent.

3. The method of removing and preventing alluvium deposits in water systems which comprises adding to such systems a mixture consisting essentially of insoluble potassium metaphosphate, a solubilizing agent therefor and bentonite.

4. The method as claimed in claim 3 wherein the bentonite comprises about 50 to 90%, the insoluble potassium metaphosphate about 4% to 30% and the balance a solubilizing agent for said potassium metaphosphate.

5. A composition for removing and preventing alluvium deposits in water systems consisting essentially of insoluble potassium metaphosphate, a solubilizing agent therefor and bentonite.

6. A composition as claimed in claim 5 wherein the bentonite comprises about 50% to 90%, the insoluble potassium metaphosphate about 4% to 30% and the balance a solubilizing agent for said potassium metaphosphate.

7. A composition as claimed in claim 5 wherein the solubilizing agent is a salt of a member from the group consisting of ammonium, lithium and sodium and free from the presence of ions of aluminum, silicon, hydroxide and peroxide.

8. The method of removing and preventing alluvium deposits in water systems which comprises adding to such systems a mixture consisting essentially of 50% to 90% bentonite, 4% to 30% insoluble potassium metaphosphate, and the balance sodium chloride as a solubilizing agent for said potassium metaphosphate.

References Cited

UNITED STATES PATENTS

| | | | |
|---|---|---|---|
| 2,393,560 | 1/1946 | Partridge | 210—57 XR |
| 2,405,276 | 8/1946 | Taylor | 210—57 |
| 3,085,916 | 4/1963 | Zimmie et al. | 134—22 |
| 3,173,864 | 3/1965 | Freedman | 210—57 |

FOREIGN PATENTS 901,765  11/1944  France.

OTHER REFERENCES

Schwartz et al., Phosphates In Water Conditioning, Ind. and Eng. Chem., January, 1942, vol. 34, pp. 32–40.

Betz Handbook of Industrial Water Conditioning, Fifth Edition, 1958, Betz Laboratories, Inc., Phila., Pa., pp. 148–178, pp. 148–151 and 174–175 particularly relied on.

MICHAEL E. ROGERS, Primary Examiner

U.S. Cl. X.R.

21—2.7; 134—22; 252—181